United States Patent [19]

Grossman

[11] 4,288,011
[45] Sep. 8, 1981

[54] ADJUSTABLE CONTAINER

[76] Inventor: Robert D. Grossman, 22 Rivo Alto Dr., Miami Beach, Fla. 33139

[21] Appl. No.: 5,742

[22] Filed: Jan. 22, 1979

[51] Int. Cl.³ .......................................... B65D 43/16
[52] U.S. Cl. ............................... 224/42.42; 280/769; 296/37.6; 312/205; 312/DIG. 33
[58] Field of Search ............... 224/42.42 R, 42.03 A, 224/42.03 R, 273, 279, 42.45 R; 296/24 R, 37.6, 37.5; 312/DIG. 33, 242, 205; 280/769

[56] References Cited

U.S. PATENT DOCUMENTS

| | | | |
|---|---|---|---|
| 1,904,114 | 4/1933 | Ambrosius | 224/42.42 R |
| 1,917,980 | 7/1933 | Kelsey | 312/205 UX |
| 3,640,423 | 2/1972 | Parker et al. | 296/37.6 X |
| 3,847,316 | 11/1974 | McInnes | 224/42.42 R X |
| 4,061,395 | 12/1977 | Boole | 312/205 X |
| 4,085,987 | 4/1978 | Vartdal | 312/DIG. 33 X |

FOREIGN PATENT DOCUMENTS 129923  4/1902  Fed. Rep. of Germany ...... 312/205

*Primary Examiner*—Robert J. Spar
*Assistant Examiner*—Jerold M. Forsberg
*Attorney, Agent, or Firm*—Leitner, Palan, Martin & Bernstein

[57] ABSTRACT

An adjustable container primarily for use as a tool or utility box for pickup trucks. The adjustable container is formed of two telescopically engaging sections, each of which includes a pivoted top closure member, integrally molded side and bottom supports and an inner shelf support. With the exception of the interfitting parts of each section, the two sections are preferably identical. The bottom supports are hollow and serve as a reservoir to hold liquids that may spill within the container.

16 Claims, 9 Drawing Figures

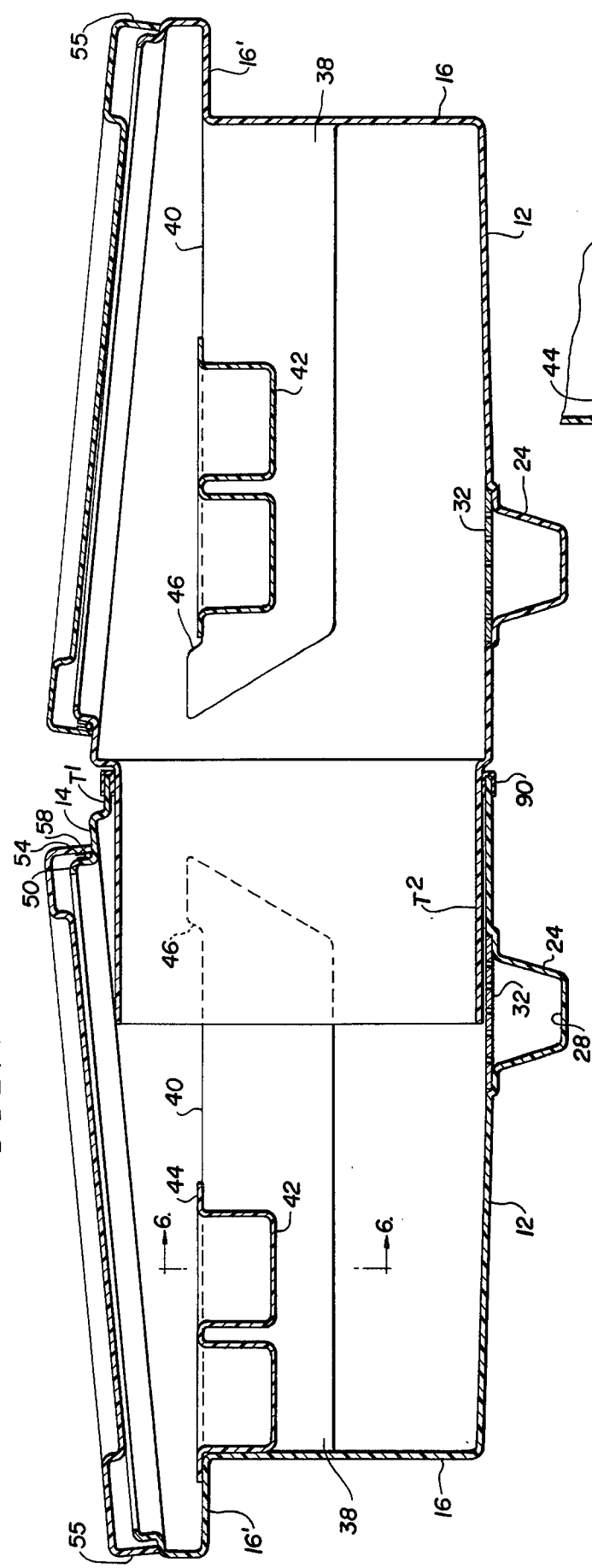
*FIG. 5*
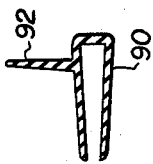
*FIG. 6*
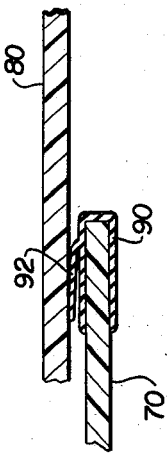
*FIG. 7*
*FIG. 8*

ADJUSTABLE CONTAINER

BACKGROUND OF THE INVENTION

This invention relates to a container primarily for use as a tool or utility box for pickup trucks and which can be adjusted lengthwise to fit the different spacings between the side panels of the various types of pickup trucks.

The use of tool or utility boxes in pickup trucks is commonplace; however, the many types of imported and domestic pickup trucks has required the production of many different sizes of tool or utility boxes. Since the truck sizes can vary both in the width dimension between side panels as well as in the side panel heights, it is necessary for a box manufacturer to produce boxes of several widths and for each different width, boxes of different heights must also be produced. This of course raises the manufacturing costs of each box as well as increasing the space requirements for storing the different size boxes.

Telecoping containers and other receptacles are, of course, well known for various uses; however, the particular environment of a pickup truck presents problems not normally encountered by the typical telescoping container. For example, the pickup truck bed and side panels under usual driving conditions will place considerable stress on a container mounted on the bed. The container will also require strong sides to avoid cracking or splitting upon being hit by other objects in the truck. Additionally, the interior of the container should remain dry and, therefore, the container must keep rain or snow from entering through the cover or through the telescoping sections.

There thus exists a need for a strong, waterproof tool or utility box that is adjustable both in its longitudinal direction as well as in its height so that one box can be adjusted to fit several different kinds of pickup trucks.

OBJECTS OF THE INVENTION

It is an object of the invention to provide a new and improved adjustable container for use on pickup trucks.

It is another object of the present invention to provide a new and improved adjustable container which can be telescopically adjusted in its longitudinal direction to fit between various side panel spacings.

It is still another object of the present invention to provide an adjustable container that includes adjustable leg supports to adjust the overall height of the container so that it may be properly supported on various side panel heights.

A further object is to provide an adjustable container having sealing means to effectively prevent water from entering the container through the telescoping parts and having a reservoir within the container to hold any liquid that might enter or spill within the container.

It is yet another object of the present invention to provide an adjustable container formed of two sections with the two sections being identically formed except for the interfitting parts of each section.

It is still yet another object of the present invention to provide an adjustable container that is simple and inexpensive to manufacture and which is composed of a minimun of easily assembled parts.

SUMMARY OF THE INVENTION

The above outlined objectives as well as other objects and features of the present invention are accomplished by a container formed of a pair of sections, preferably of molded plastic, which are telescopically fitted together to provide a container that is longitudinally adjustable. Each section includes a bottom wall having an integral leg, an open upper wall with a pivoted closure member thereon, a pair of longitudinal side walls having an integrally molded inner shelf support, an outer side panel support, a closed end wall and an open end wall. The only difference in the two sections is in the telescoping parts extending from the open end wall of each section. A sealing means such as a gasket is placed about one of the telescoping parts to cooperate with the other telescoping part to provide an effective sealing of the space between the telescoping parts. Another important feature is the use of the leg portions which are hollow formed as reservoirs to contain any liquid that may enter or spill within the container.

BRIEF DESCRIPTION OF THE DRAWINGS

For a full understanding of the nature and objects of the invention, reference should be had to the following detailed description taken in conjunction with the accompanying drawings in which:

FIG. 5 is a sectional view taken along line 5—5 in FIG. 1 and looking in the direction of the arrows;

FIG. 6 is a partial sectional view taken along the lines 6—6 in FIG. 5;

FIG. 7 is a cross section of the gasket in its relaxed condition.

FIG. 8 is a detail of the sealing gasket when the two sections of the adjustable container are telescoped together.

DESCRIPTION OF THE PREFERRED EMBODIMENT

Figure 1:
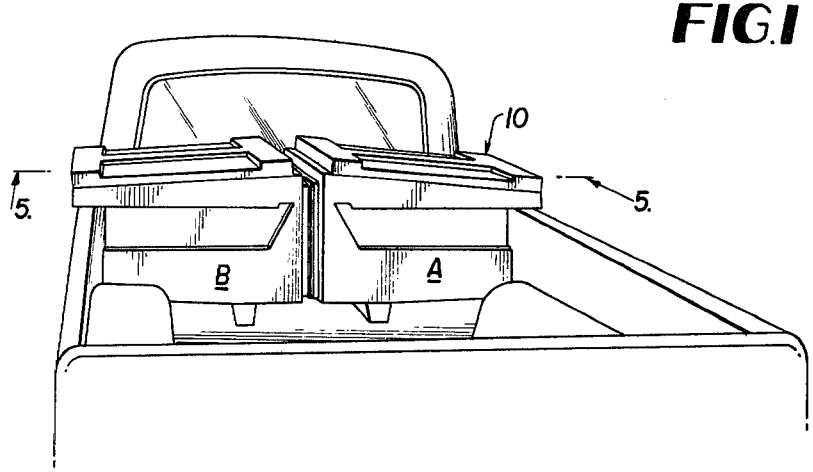
FIG. 1 is a perspective view of a narrow bed pickup truck with the adjustable container of the present invention in place therein with the container in its smallest longitudinal condition.
Figure 2:
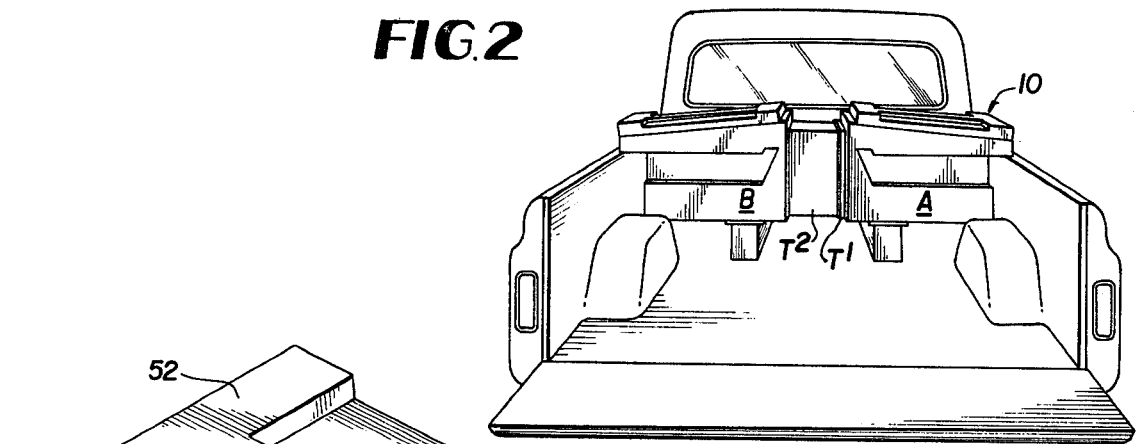
FIG. 2 is a perspective view of a wide bed pickup truck with the adjustable container of the present invention in place therein with the container in its fully extended condition and with leg extensions in position.

Referring now to the drawings in detail, wherein like reference numerals indicate like parts throughout the several figures, reference numeral 10 indicates the adjustable container of the present invention and is shown positioned in a "narrow bed" pickup truck in FIG. 1 and in a "wide bed" pickup truck in FIG. 2. It is to accomodate the difference in width between the side panels of the "wide bed" and "narrow bed" pickup trucks which may be up to 9 inches wider in the "wide bed" pickup truck and the differences in height of the side panels which may be up to 3 inches higher in the "wide bed" pickup truck that the invention is directed.

The container 10 comprises two separable telescoping sections A and B which are adapted to telescopically fit together to provide the adjustment necessary to use the container with various kinds of pickup trucks. As will be discussed hereinafter, the sections A and B are essentially identical except for the telescoping parts $T^1$ and $T^2$ on sections A and B, respectively. Both sections are formed of a plastic material characterized by its strength, its low coefficient of expansion and its resistance to breaking at cold temperatures. A suitable material, for example, is the product knwon as CL 100, available from Phillips Petroleum Company.

Each section, A and B, includes a bottom wall 12, an open top wall 14, a closed end wall 16, an open end wall 18 and a pair of similar side walls 20,22. As stated above, the only difference in the two sections is in the telescoping parts with part $T^1$ integrally attached to open end wall 18 of section A and part $T^2$ integrally attached to open end wall 18 of section B.

Figure 3:
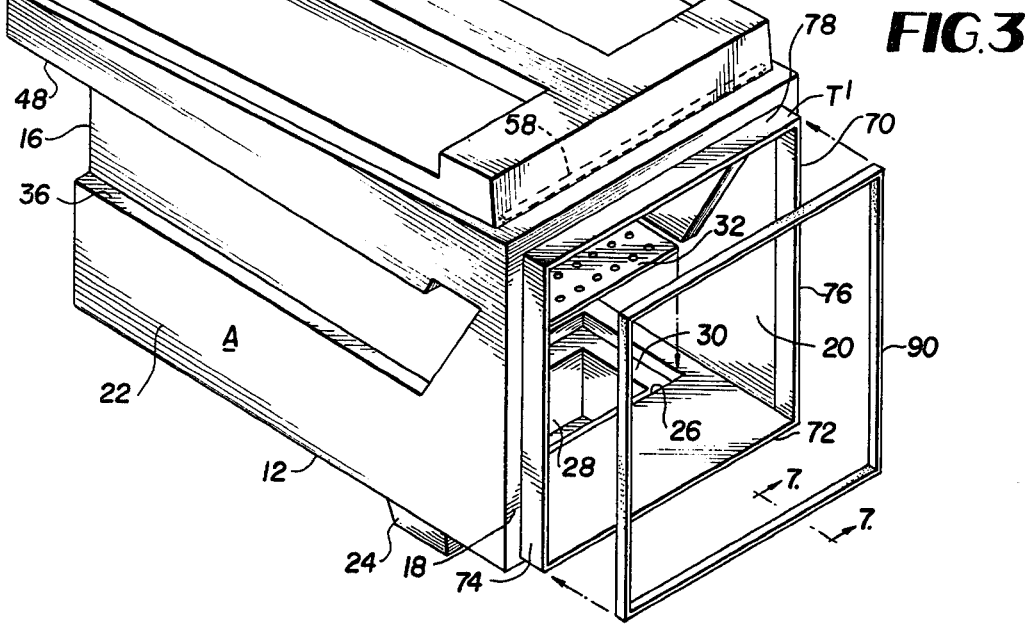
FIG. 3 is a perspective view showing a section of the adjustable container.

The bottom wall 12 has an integrally formed leg 24 extending therefrom and when the two sections are assembled together, the pair of legs 24,24 comprise the bottom support for the adjustable container 10. As seen best in FIG. 3 and FIG. 9, the leg 24 extends substantially the entire distance between side walls 20,22 to provide a strong transverse support for the container and at the same time spaces the bottom wall 12 from the pickup truck bed to permit placement of items under the container. The leg 24 of each section is formed hollow and communicates with an opening 26 in bottom wall 12 to provide a reservoir section 28 for capturing any liquids that might spill within the container 10. A recess 30 is formed about opening 26 in which a rectangular plate 32 having openings 34 therein is seated to act as a cover for reservoir section 26 to prevent any other objects in the container from falling into the reservoir section 28. By forming the depth of recess 30 substantially the same as the thickness of plate 32, the plate 32 when in place will lie flush with the interior of bottom wall 12. To facilitate flow of liquids into reservoir section 28, the bottom wall 12 may be slightly downwardly inclined from end wall 16 to reservoir section 28. Such inclination need be only 1 or 2 degrees from the horizontal to assure the liquid flow into the reservoir section 28.

Figure 4:
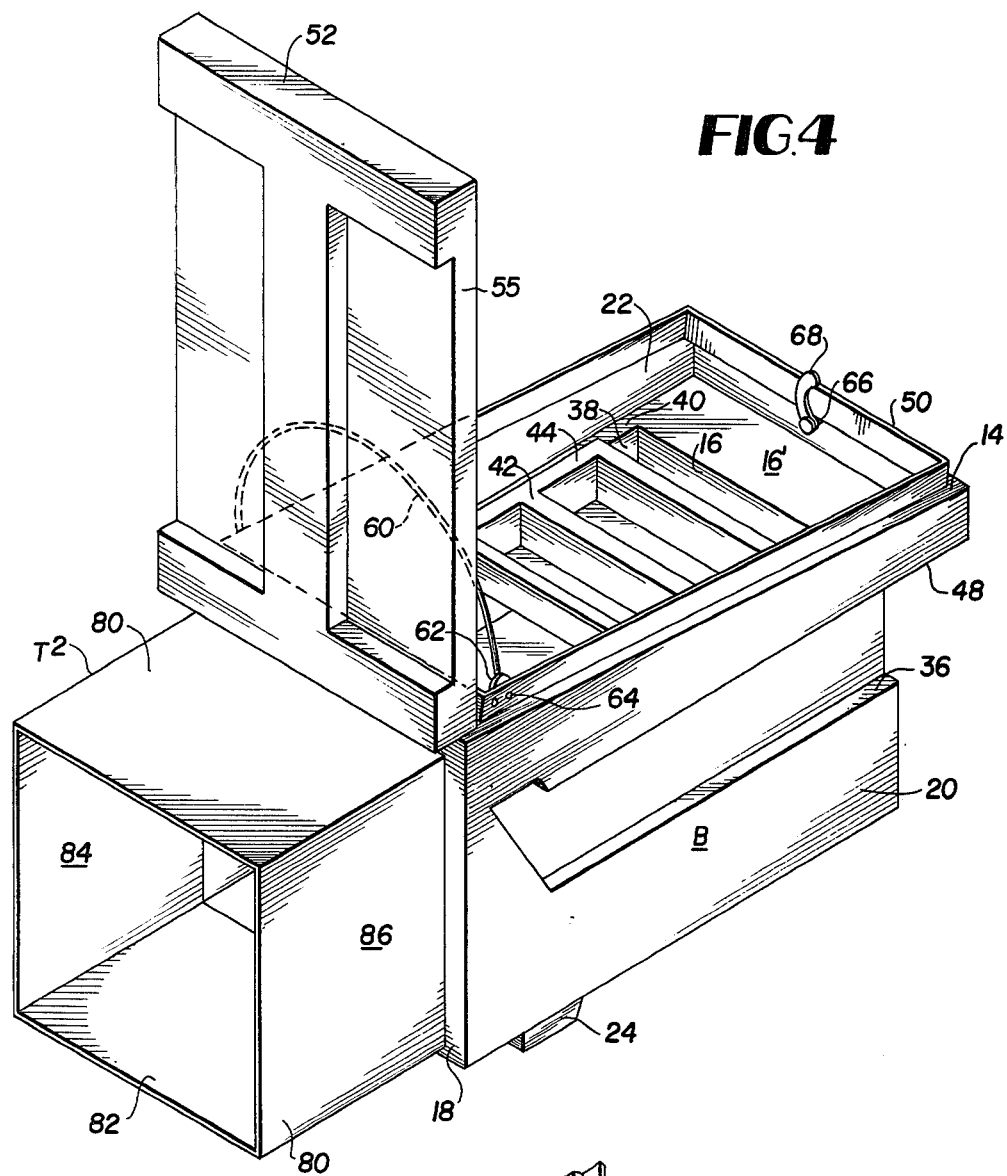
FIG. 4 is a perspective view showing the other section of the adjustable container.

Each side wall of 20,22 of each section A,B is integrally formed on its outer surface with a recess 36 to thus form on each side wall inner surface a shelf support 38. The shelf support 38 includes an upper surface 40 normal to the side wall upon which a slidable tray 42 having a flange 44 about its periphery may be positioned for sliding movement along shelf support 38. The shelf support 38 terminates at one end at closed end wall 16 and at its other end, the shelf support 38 is formed with an upward step 46 which acts as a stop for the tray 42. The tray 42 is easily grasped and removed from the section through open top wall 14. Each side wall 20,22 is also longitudinally extended above the recess 36 to form, with a stepped horizontal portion $16^1$ of end wall 16, a shoulder 48 which acts as an upper support for the container 10, with each shoulder 48 of container 10 adapted to sit on top of a side panel of the pickup truck as seen in FIGS. 1 and 2. As best seen in FIG. 4, horizontal portion $16^1$ is aligned with upper surface 40 of shelf support 38 to allow flange 44 of tray 42 to rest thereon when the tray is against end wall 16.

The open top wall 14 of each section A,B includes an upwardly extending flange 50 upon which a cover 52 is pivotally secured by hinge member 54. The cover 52 includes a downwardly depending flange 55 which cooperates with flange 50 to provide a watertight fit between the cover 52 and the top wall 14. The hinge member 54 comprises a pair of leaf elements 56,58 with leaf 56 attached to flange 50 and leaf 58 attached to flange 56. A torsion spring 60 may be provided to bias the cover to its open position and the ends 62 of the spring 60 are attached to flange 50 by suitable means such as rivet members 64. A suitable lock 66 may be provided to prevent unauthorized access to the inside of each section A,B. Operation of lock 66 will actuate bolt 68 into and out of a suitable striker plate (not shown) affixed to cover 52.

As previously mentioned, sections A and B of adjustable container 10 are structurally similar with the exception of the telescoping portions $T^1$ and $T^2$. However, it should be fairly obvious that the sections A and B need not be fully similar as long as the telescoping portions $T^1$ and $T^2$ are on the two sections to be telescoped together to form an adjustable container.

Telescoping portion $T^1$ comprises a continuous flange 70 extending in the longitudinal direction from the open end wall 18 of one of the sections, shown herein as section A. The flange 70 has its bottom portion 72, as viewed in FIG. 3, in the same plane as bottom wall 12. The side portions 74,76 of flange 70 are inwardly offset from the planes of side wall 20,22 and flange 70 top portion 78 is also slightly inwardly offset from the plane of top wall 14.

Telescoping portion $T^2$ comprises a continuous flange 80 extending in the longitudinal direction from the open end wall 18 of the other one of the sections, shown herein as section B. The flange 80 has its bottom portion 82, as seen best in FIG. 4, slightly upwardly offset from bottom wall 12. The side portions 84,86 of flange 80 are inwardly offset from the plane of side walls 20,22 and flange 80 top portion 88 is also slightly offset from the plane of top wall 14.

Since portion $T^2$ is adapted to telescope within portion $T^1$ the offsets of flange 80 are sufficiently greater than the offsets of flange 70 to permit such telescoping. The amount of the offset of flange 70 is sufficient to insure clearance of flange 80 side portions 84,86 past the sides of shelf support 38 of section A and top portion 88 past a portion of top wall 14 which is preferably formed with a downward slope from end wall 18 toward end wall 16.

In order to permit adjustment of the container 10 to accommodate the up to 9 inch difference in width between the typical "narrow bed" and "wide bed" pickup trucks, it is preferable to make the flange 70 width 2 inches and to make the flange 80 width 11 inches thereby providing at least a two inch support for flange 80 by flange 70 when container 10 is in its fully extended condition. When the container 10 is in its narrowest condition, as shown in FIG. 5, the bottom portion 82 of flange 80 will be supported by a portion of bottom wall 12 as well as bottom portion 32 of flange 70.

A resilient gasket element 90 is preferably placed on flange 70 to prevent any water from entering the container through the space between flanges 70 and 80. The gasket element 90 is preferably U-shaped to frictionally fit onto flange 70 and includes an inner finger 92 extending normal to the gasket body such that upon insertion of flange 80, the finger 92 will flex downwardly to permit the flange 80 to pass thereby, with the finger 92 constantly pressing against flange 80 to seal any spacing between the two flanges when Sections A and B are telescoped together.

Figure 9:
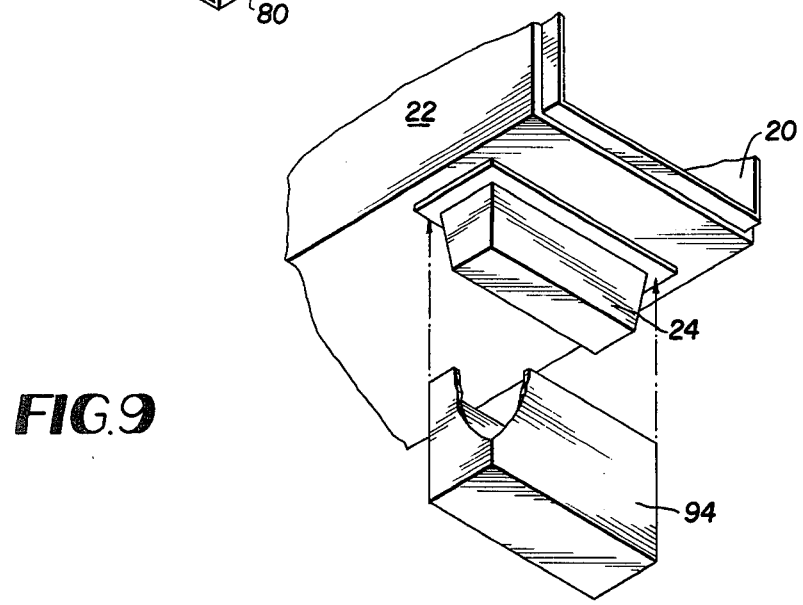
FIG. 9 is a partial perspective view showing the placement of the leg extensions onto a container section.

As previously mentioned, the "wide bed" pickup trucks generally have side panels 3 inches higher than the "narrow bed" trucks. To permit the container 10 to be supported on the bed of these wider trucks, hollow leg extensions 94, as shown in FIG. 9, are utilized to frictionally fit onto legs 24 of the container 10 with the extensions 94 being preferably formed 3 inches longer than the leg 24 height.

It will thus be seen that the objects set forth above are efficiently attained and since certain changes may be made in the above construction without departing from the scope of the invention, it is intended that all matter contained in the above description or as shown in the accompanying drawing shall be interpreted as illustrative and not in a limiting sense.

What is claimed is:

1. An adjustable container adapted to fit between the side panels of pickup trucks, said container comprising first and second sections, said first section having a bottom wall, an open top wall, a closed end wall, an open end wall, first and second longitudinal side walls, a bottom support means connected to said bottom wall and adapted to rest upon the pickup truck bed, an upper support means formed by said side walls and said closed end wall and adapted to rest upon one of said side panels, and a first telescoping means connected to said open end wall, said second section having a bottom wall, an open top wall, a closed end wall, an open end wall, first and second longitudinal side walls, a bottom support means connected to said bottom wall and adapted to rest upon the pickup truck bed, an upper support means formed by said side walls and said closed end wall and adapted to rest upon the other one of said side panels, and a second telescoping means connected to said open end wall, said first telescoping means adapted to be slidable within said second telescoping means whereby said longitudinal dimension of said container is adjustable by the relative movement of said first and second telescoping means, each of said sections including a closure means to cover said open top wall, each closure means on each section being operable from a closed to an open position regardless of the relative positions of said first and second telescoping means wherein said bottom support means is adapted to space said bottom walls from said pickup truck bed and to slide upon said bed as said container is adjusted whereby bottom support is provided for said container regardless of the relative positions of said first and second telescoping means.

2. The adjustable container of claim 1 wherein each of said bottom support means includes a leg integrally formed with said bottom wall, said leg being hollow and said bottom wall having an opening communicating with said hollow portion of said leg.

3. The adjustable container of claim 2 wherein said bottom wall has a recessed portion surrounding the periphery of said bortom wall opening and an apertured plate adapted to fit in said recessed portion and in said bottom wall opening.

4. The adjustable container of claim 3 wherein said bottom wall is downwardly inclined between said closed end wall and said bottom wall opening.

5. The adjustable container of claim 1 wherein each of the side walls of at least one section have longitudinal recesses therein to form an interior shelf support, said shelf support including an upper surface normal to the side walls, and a tray including a flange means thereon adapted to slidably move along said shelf support upper surface.

6. The adjustable container of claim 5 wherein said shelf support upper surface includes an upwardly stepped portion which acts as a stop for the slidable tray.

7. The adjustable container of claim 5 wherein each of said bottom support means is a leg integrally formed with said bottom wall, said leg being hollow and said bottom wall having an opening communicating with said hollow portion of said leg.

8. The adjustable container of claim 7 wherein said bottom wall is downwardly inclined between said closed end wall and said bottom wall opening.

9. The adjustable container of claim 1 wherein said first telescoping means is a first flange means extending from said open end wall of said first section along the longitudinal axis of said container and said second telescoping means is a second flange means extending from said open end wall of said second section along the longitudinal axis of said container, said second flange means being of greater longitudinal dimension than said first flange means and being spaced inwardly from said container walls to fit within said flange means.

10. The adjustable container of claim 9 including a sealing means on said first flange means, said sealing means including a resilient element extending therefrom and in contact with said second flange means.

11. The adjustable container of claim 9 wherein each of the side walls of at least one section have longitudinal recesses therein to form an interior shelf support, said shelf support including an upper surface normal to the side walls, and a tray including a flange means thereon adapted to slide upon said shelf support upper surface.

12. The adjustable container of claim 11 wherein said shelf support upper surface includes an upwardly stepped portion which acts as a stop for the slidable tray.

13. The adjustable container of claim 11 wherein said open top wall includes an upwardly extending flange surrounding the top wall opening and a closure member is pivotally connected thereto to close said opening.

14. The adjustable container of claim 13 wherein a resilient means is attached to said upwardly extending flange to bias said closure member to its open position.

15. The adjustable container of claim 2 including leg extension means adapted to be placed on said integrally formed legs to increase the height dimension of said container.

16. An adjustable container adapted to fit between the side panels of pickup trucks, said container comprising first and second sections, said first section having a bottom wall, an open top wall, a closed end wall, an open end wall, first and second longitudinal side walls, a bottom support means connected to said bottom wall and adapted to rest upon the pickup truck bed, an upper support means formed by said side walls and said closed end wall and adapted to rest upon one of said side panels, and a first telescoping means connected to said open end wall, said second section having a bottom wall, an open top wall, a closed end wall, and open end wall, first and second longitudinal side walls, a bottom support means connected to said bottom wall and adapted to rest upon the pickup truck bed, an upper support means formed by said side walls and said closed end wall and adapted to rest upon the other one of said side panels, and a second telescoping means connected to said open end wall, said first telescoping means adapted to be slidable within said second telescoping means whereby the longitudinal dimension of said container is adjustable by the relative movement of said first and second telescoping means, each of said bottom support means is a hollow leg connected to said bottom wall, said bottom wall of each section having an opening communicating with said hollow portion of said leg and said bottom wall of each section being downwardly inclined between said closed end wall and said bottom wall opening.

* * * * *